(No Model.) 6 Sheets—Sheet 1.

G. H. OBER.
TURNING LATHE.

No. 583,505. Patented June 1, 1897.

WITNESSES:
J. C. Little
H. O. Bailey

INVENTOR
G. H. Ober,
BY
Burridge & Cutter,
ATTORNEYS.

(No Model.)  6 Sheets—Sheet 2.

G. H. OBER.
TURNING LATHE.

No. 583,505. Patented June 1, 1897.

WITNESSES:
J. G. Little
H. O. Bailey

INVENTOR
G. H. Ober,
BY
Burridge & Cutter,
ATTORNEYS.

(No Model.) 6 Sheets—Sheet 3.

G. H. OBER.
TURNING LATHE.

No. 583,505. Patented June 1, 1897.

WITNESSES:
J. C. Little
H. P. Bailey

INVENTOR
G. H. Ober,
BY
Burridge & Cutter,
ATTORNEYS.

(No Model.) 6 Sheets—Sheet 4.

G. H. OBER.
TURNING LATHE.

No. 583,505. Patented June 1, 1897.

WITNESSES:
J. C. Little
L. O. Bailey

INVENTOR
G. H. Ober,
BY
Burridge & Cutter,
ATTORNEYS.

(No Model.)  6 Sheets—Sheet 5.

G. H. OBER.
TURNING LATHE.

No. 583,505. Patented June 1, 1897.

WITNESSES:
J. C. Little
H. O. Bailey

INVENTOR
G. H. Ober.
BY
Burridge & Cutter,
ATTORNEYS.

(No Model.) 6 Sheets—Sheet 6.

G. H. OBER.
TURNING LATHE.

No. 583,505. Patented June 1, 1897.

WITNESSES:
J. C. Little
H. P. Bailey

INVENTOR
G. H. Ober,
BY
Burridge & Cutter
ATTORNEYS.

UNITED STATES PATENT OFFICE.

GEORGE H. OBER, OF CHAGRIN FALLS, OHIO.

TURNING-LATHE.

SPECIFICATION forming part of Letters Patent No. 583,505, dated June 1, 1897.

Application filed July 1, 1896. Serial No. 597,719. (No model.)

*To all whom it may concern:*

Be it known that I, GEORGE H. OBER, a citizen of the United States, residing at Chagrin Falls, in the county of Cuyahoga and State of Ohio, have invented certain new and useful Improvements in Turning-Lathes, of which the following is a full, clear, and exact description.

My invention relates to that class of lathes used for turning wood; and it consists of the several parts and combinations of parts hereinafter fully described and particularly claimed.

The object of my improvement is to provide a lathe which turns rough angular sticks of wood into articles of various lengths, sizes, and shapes—such as rake-handles, billiard-cues, curtain-poles, &c.—with great rapidity, precision, and uniformity. The raw material, generally in the form of rectangular sticks of wood, is fed into one end of my machine and comes out at the other end of said machine as a complete or finished product except rounding off the butt when required and polishing. Only round surfaces in cross-section are turned, but in longitudinal section the contour of compound curves may be varied any number of times, as will appear in the following description.

My machine is automatic in action after being adjusted to perform any given work. Hence its precision and rapidity of action are assured. It is simple and easy to operate, requiring no particular skill on the part of the person who runs the machine, and the several parts are at all times accessible.

That my invention may be seen and fully understood by those skilled in the art reference will be had to the following specification and annexed drawings, forming a part thereof, in which—

Figure 1:
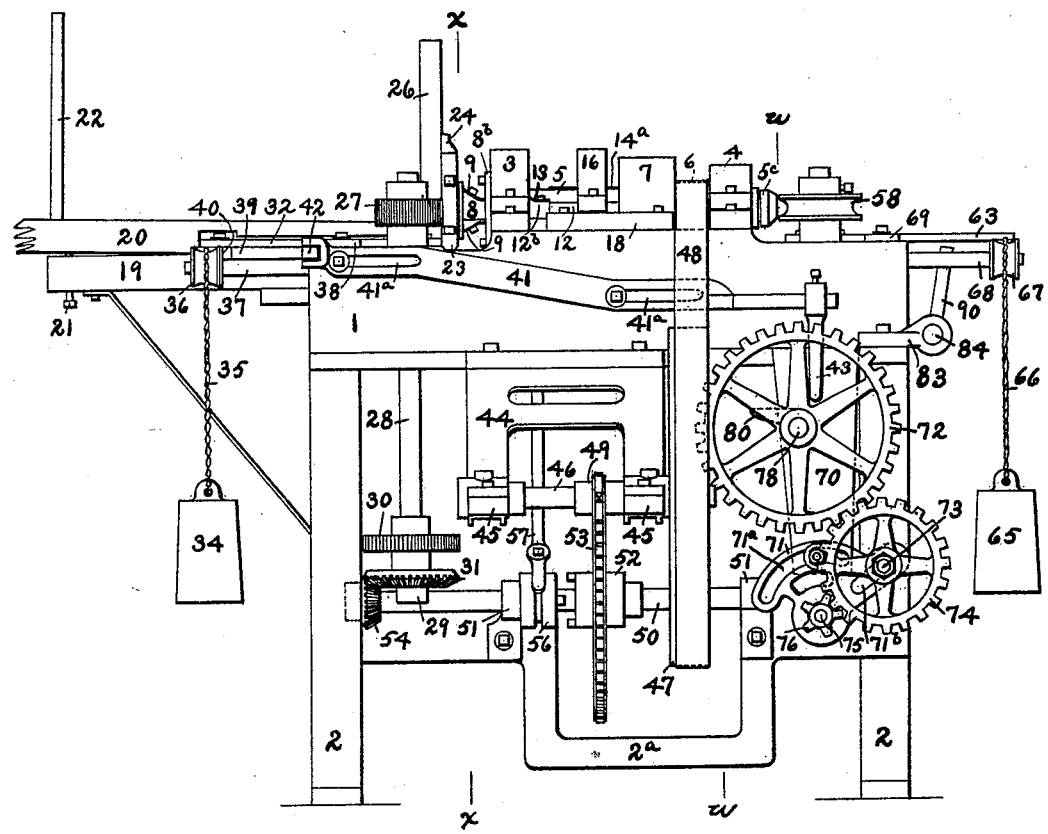
Figure 2:
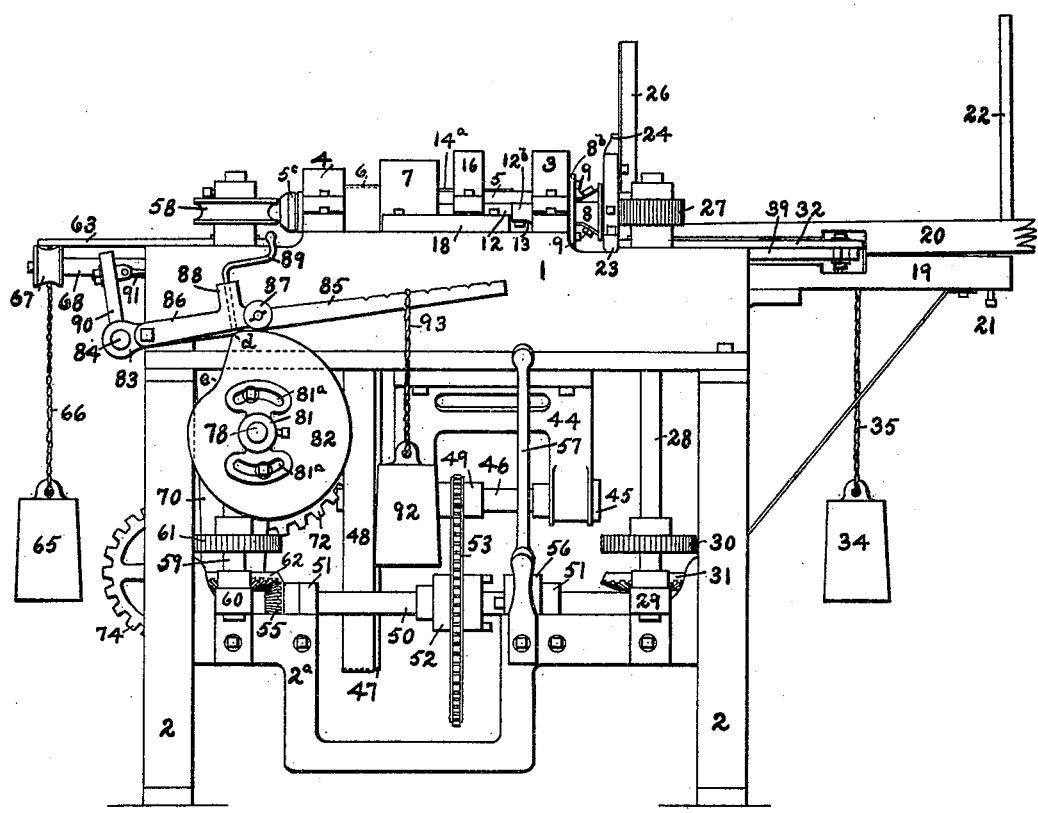
Figure 3:
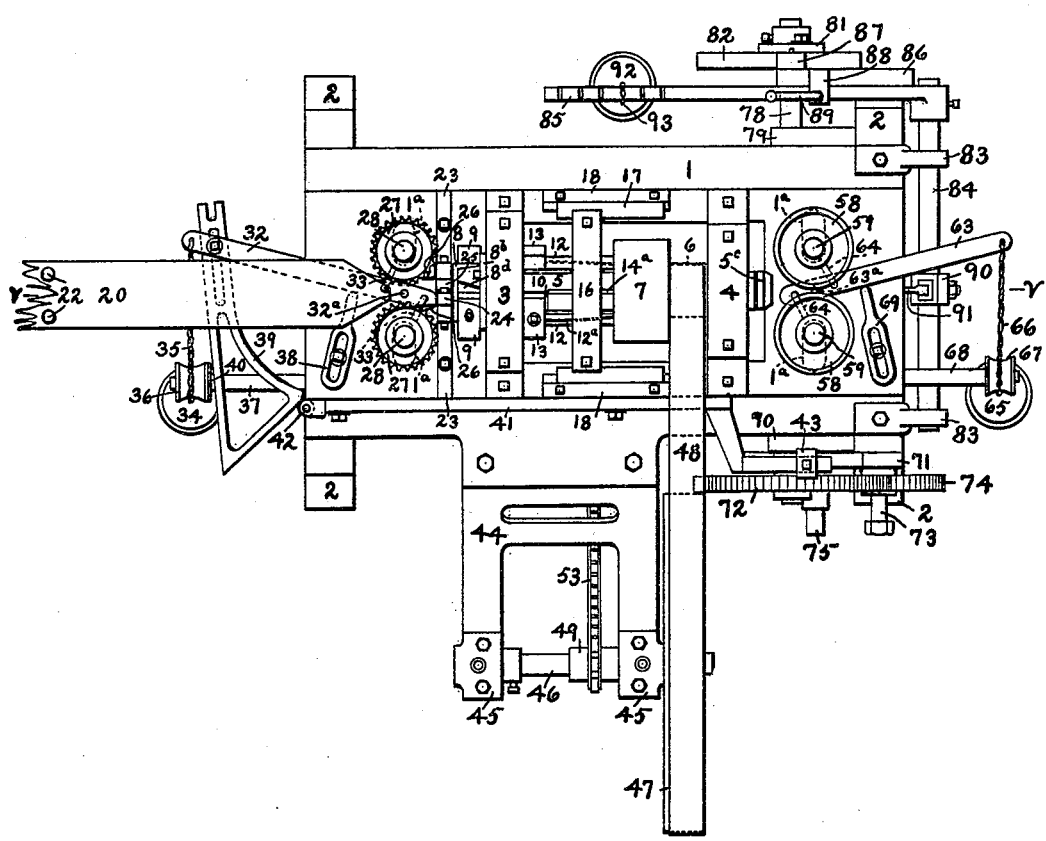
Figure 4:
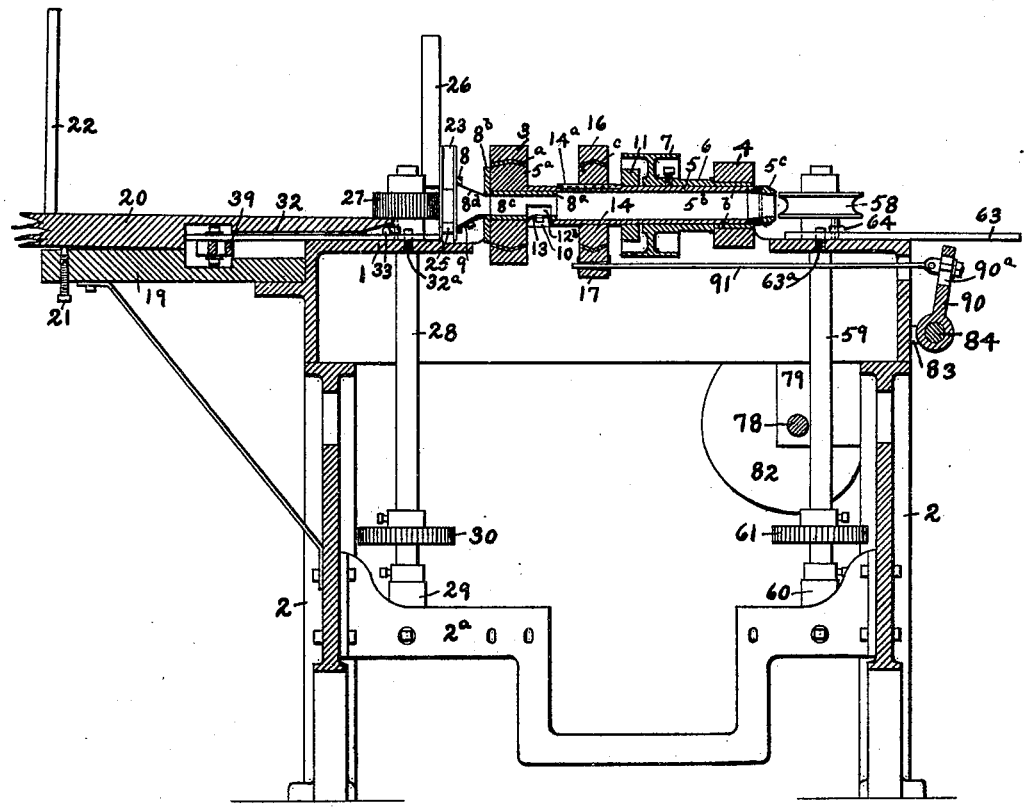
Figure 6:
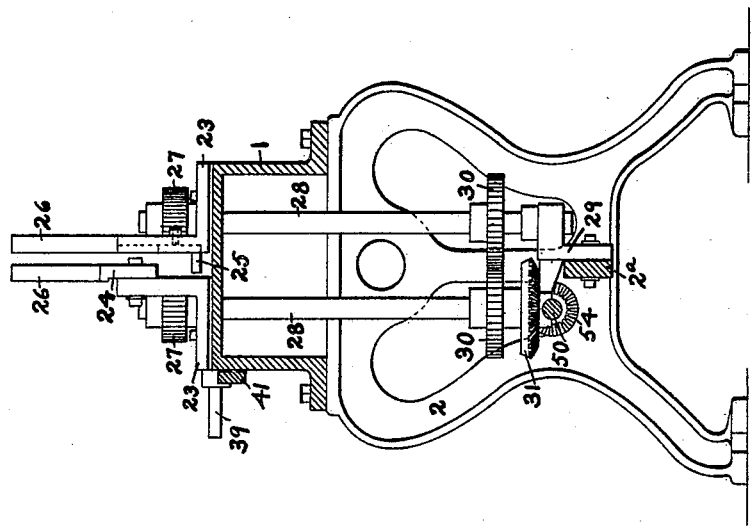
Figure 5:
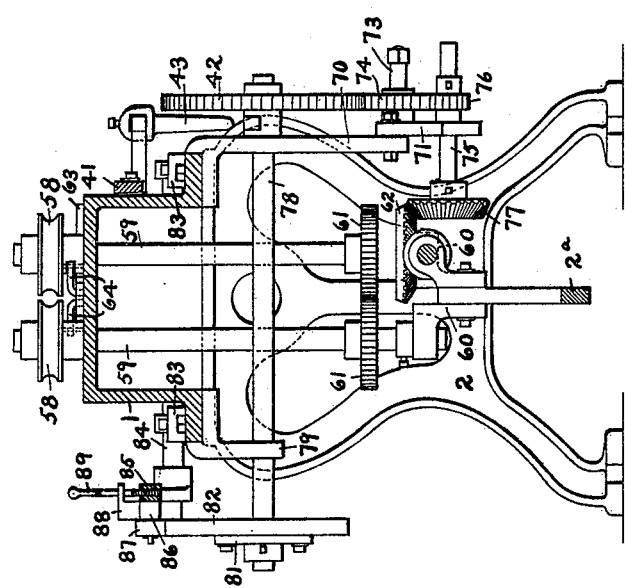
Figure 7:
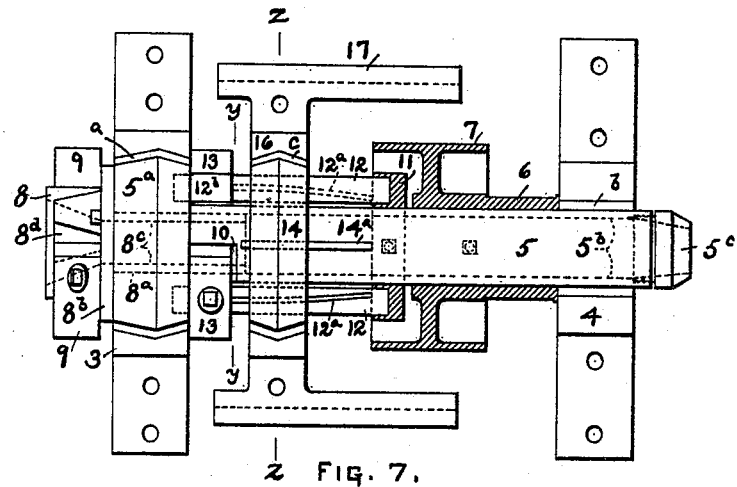
Figure 8:
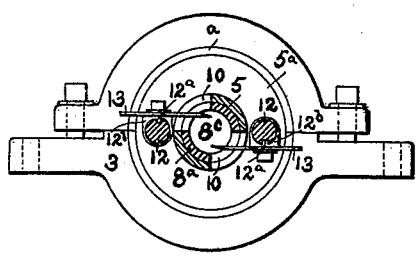
Figure 9:
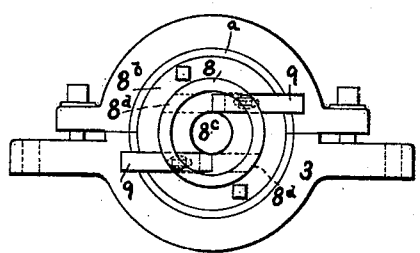
Figure 10:
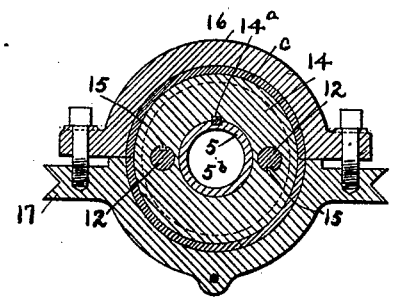

Figure 1 is a front elevation of my turning-lathe; Fig. 2, a rear view of said lathe; Fig. 3, a plan view of the same; Fig. 4, a longitudinal vertical section on lines $v\ v$, Fig. 3, looking toward the rear; Fig. 5, a transverse vertical section on lines $w\ w$, Fig. 1, looking toward the right; Fig. 6, a transverse vertical section on lines $x\ x$, Fig. 1, looking toward the left; Fig. 7, an enlarged top view of the knife mechanism; Fig. 8, a section on lines $y\ y$, Fig. 7, looking to the left; Fig. 9, a left-hand end view of the mechanism shown in Fig. 7, illustrating the non-automatically adjustable knives; and Fig. 10, a section on lines $z\ z$, Fig. 7.

Similar figures and letters of reference designate like parts in the drawings and specification.

The bed 1 is supported by the legs 2 2 and has the box-bearings 3 and 4 bolted to the top thereof, which carry the hollow shaft 5. On the shaft 5 next to the bearing 4 is the small pulley 6, rigidly connected to said shaft, and the main driving-pulley 7 is bolted or otherwise secured to said shaft at the left of said pulley 6. Motive power is applied to the pulley 7 by a belt. (Not shown in the drawings.) The shaft 5 terminates at the left in the enlarged annular head $5^a$. The periphery of the head $5^a$ tapers from a point near the center downward in both directions, and the shape of the interior of the bearing 3, which supports said head, corresponds to that of said periphery. Hence the shaft 5 is secure from any lateral movement. The longitudinal passage $5^b$ extends entirely through the shaft 5 and the head $5^a$. The extension $5^c$ is attached to the shaft 5, opposite the head $5^a$, to lengthen said shaft, and the passage $5^b$ is continued through said extension.

The knife-holder 8 outside of the bearing 3 is provided with the shank $8^a$, extending into the passage $5^b$, and said shank has the collar $8^b$ bolted to the face of the head $5^a$. The longitudinal passage $8^c$ extends entirely through the holder 8 and the shank $8^a$. The knives 9 9 are received into the slots $8^d$, and said knives are secured to the holder 8 by bolts in the ordinary manner. The knives 9 are slotted for adjustment to cut various-sized round surfaces only, and their purpose is simply to round off the stick. The openings 10 10 appear in the shaft 5 and shank $8^a$ for the reception of knives, hereinafter described. The two openings 10 are opposite each other, and each is about a quarter of a circle in circumference. Said openings are located at the right of the bearing 3. In Fig. 7 the tops of the bearings 3 and 4 are removed to show the head $5^a$ in full and the pulley 7 and the collar 11 in section.

The collar 11 is tight on the shaft 5 inside of the left-hand end of the pulley 7, and the spindles 12 12 have loose bearings at opposite ends in said collar and the head 5ª. Each of the spindles 12 is provided with the slightly spiral groove 12ª, the groove in the front spindle being on the top and extending from the collar 11 to the boss 12ᵇ in a forward direction and the groove in the rear spindle being in the bottom and extending from said collar to the boss 12ᵇ in a rearward direction. The bosses 12ᵇ 12ᵇ appear on the top and bottom of the front and rear spindles 12, respectively, near the head 5ª, and the knives 13 13 are bolted to said bosses. The cutting edges of the knives 13 extend through the openings 10 into the shaft-passage 5ᵇ. The disk 14 is attached to the shaft 5 by the key 14ª, and while lateral movement of said disk is permitted on said shaft the former must revolve with the latter. Holes are provided in the disk 14 to receive the spindles 12, and the studs 15 15 project into said openings and register with the grooves 12ª. The periphery of the disk 14 is similar to that of the head 5ª, and said disk is carried by the box-bearing 16, forming a part of the carriage 17. The top of the bearing 16 is removed in Fig. 7. The carriage 17 is reciprocated on the ways 18 18, bolted to opposite sides of the bed 1. It will now be understood that if the carriage 17 be reciprocated to the left the cutting edges of the knives 13 will be turned outward from the center through the medium of the disk 14, the studs 15, and the spirally-grooved spindles 12, to which said knives are attached, the latter working freely through the openings 10; and if the carriage 17 is reciprocated to the right the cutting edges of the knives 13 will be turned inward through the same medium as before.

The boxes 3, 4, and 16 are babbitted in the usual manner, as shown at $a$, $b$, and $c$.

The wooden bars 19 and 20 are bracketed to the left-hand end of the bed 1 and serve as a feed-table to hold the rough stock before it passes into the machine, one end of said table being broken off in the drawings. The bar 20 rises slightly from the bed 1 outward to lessen the friction between it and the material resting upon the same. The elevation of the outer end of the bar 20 is regulated by the set-screw 21. The parallel guide-rods 22 are attached to the top of the outer terminal of the bar 20 and assist in holding the sticks in place one on top of the other. The angular guides 23 23 are bolted to the top of the bed 1 close to the knife-holder 8 and may be moved crosswise of said bed by loosening the bolts which hold them in place. The guide 24 is bolted to the face of the front guide 23 and may be adjusted vertically. The guide 25 is bolted to the face of the rear guide 23 and is also adjustable vertically. The guides 23, 24, and 25, the two latter being respectively above and below the stick as it travels through the machine, are adjusted to form a rectangular passage a little larger than said stick to direct and center the same. The angular guides 26 26 perform the same service as the rods 22 and in addition prevent the sticks from being drawn out of place except as hereinafter described. The guides 26 are attached to the guides 23 and do not extend below the level of the top of the serrated wheels 27.

The serrated wheels 27 27 are fast to the upper ends of the vertical shafts 28 28, and said shafts find a loose bearing at the base in the bracket 29, bolted to the brace 2ª, which extends between the legs 2. Fast to the lower terminals of the shafts 28 are the two loosely-intermeshing gears 30, and below the gear on the front shaft is the beveled gear 31, rigidly attached thereto. The slots 1ª are cut in the bed 1 to accommodate the shafts 28. Said shafts are journaled loosely to permit them to oscillate and the wheels 27 to be drawn toward each other and separated, the movement at the base of said shafts being very slight, not sufficient, in fact, to throw the gears 30 out of mesh. The wheels 27 are normally held close enough together to permit the end of a stick which may rest upon them from falling between by means of the lever 32, pivotally attached to the shafts 28 by the links 33 33 and the counterweight 34, said lever being pivoted at 32ª to the bed 1 between the pivotal points of said links. The rope 35 passes over the idler 36 on the rod 37, which extends from the end of the bed 1, and is attached at opposite ends to the free terminal of the lever 32 and the counterweight 34. The adjustable stop 38 is bolted to the bed 1 and limits the forward movement of the lever 32, thereby determining the distance between the wheels 27 when in their closed position. The lever 32 operates beneath the end of the bar 20.

The triangle 39 is adjustably pivoted at the rear to the free end of the lever 32, and the forward part of said triangle rests upon the rod 37. The long edge of the triangle 39 bears against the washer 40, which is interposed between it and the idler 36. The right-hand angle or nose of the triangle 39 rests against the end of the bed 1. The bar 41, having the slots 41ª 41ª and the roll 42 contiguous with the short edge of the triangle 39, is movably attached to the front of the bed 1 by bolts passing through said slots. The downwardly-extending finger 43 is adjustably bolted to the end of the bar 41 opposite the roll 42. It is obvious that if the bar 41 be forced to the left the roll 42, bearing against the short edge of the triangle 39, must push said triangle backward and with it the free end of the lever 32, thereby opening or separating the wheels 27. The counterweight 34 is raised by this operation, and when pressure on the bar 41 is released said counterweight falls and returns the several parts to their former positions by a reverse movement to that above described. The triangle 39 extends between the bars 19 and 20, and by changing the point of connection between said triangle and the lever 32 the wheels 27 will be separated a greater or less distance, according as to whether said point is moved backward or forward on said triangle.

The bracket 44 is secured to the front of the bed 1, projects forward and downward, and has the bearings 45 45 to carry the shaft 46. The large pulley 47 is fast on one end of the shaft 46, outside of the bracket 44. The belt 48 connects the pulley 47 with the pulley 6. The small sprocket-wheel 49 is fast on the shaft 46 between the arms of the bracket 44.

The shaft 50 is supported by the bearings 51 51 on the brace 2ª, and the large sprocket-wheel 52 is loose on said shaft. The chain 53 connects the sprocket-wheels 52 and 49. The beveled pinions 54 and 55 are fast to opposite ends of the shaft 50, the former meshing with the gear 31 and driving the shafts 28. The shaft 50 is provided with the clutch 56, operated by the handle 57. When the sprocket-wheel 52 is brought under the control of the clutch 56, motion is imparted to the shaft 50 by means of the chain 53 and the belt 48.

At the right of the hollow shaft 5 are the grooved wheels 58 58, fast to the upper ends of the vertical shafts 59 59. The purpose of the wheels 58 is to receive the end of the turned stick as it emerges from the shaft extension 5ᶜ and convey it out of the machine. The shafts 59 pass through the slots 1ª in the bed 1 and are loosely journaled in the brackets 60 60, bolted to the brace 2ª. The loosely-intermeshing gears 61 61 are fast on the lower terminals of the shafts 59, and the beveled gear 62 is fast on the front shaft below the gear 61. The gear 62 meshes with the pinion 55 on the shaft 50. The shafts 59 oscillate in a similar manner to the shafts 28 by means of the mechanism described below.

The lever 63 is connected by the links 64 64 with the shafts 59 and is pivoted between the link-and-lever connections at 63ª to the bed 1. The wheels 58 are normally held close together by the counterweight 65, connected by the rope 66 with the free end of the lever 63. The rope 66 passes over the idler 67 on the end of the rod 68, which projects from the end of the bed 1. The minimum closure of the wheels 58 is regulated by the stop 69, adjustably bolted to the top of the bed 1 in front of the lever 63.

The apron 70 drops from the front of the bed 1 near the right leg 2 and has the segment 71 bolted thereto. The segment 71 is slotted for adjustment to accommodate differential gears for imparting various degrees of speed to the large gear 72. The segment 71 is bolted to the apron 70 through the slot 71ª, and the stud 73, which carries the intermediate gear 74, passes through the slot 71ᵇ. The gear 74 meshes with the gear 72. The base of the segment 71 supports the shaft 75, having the pinion 76 at one end meshing with the gear 74 and the beveled gear 77 at the opposite end meshing with the gear 62 on the front shaft 59. Motion is imparted to the shaft 78, which carries the gear 72, through the train of gears just described from the front shaft 59, the latter being driven from the shaft 50. The ends of the stud 73 and the shaft 75 project forward, the former to allow the pinion 76 to be adjusted so as to mesh with an additional gear (not shown) on the latter, thereby changing the velocity of the gear 72. The slots 71ª and 71ᵇ permit the change just described to be made. By driving the gear 72 fast the cuts in the stick are made more quickly, and the finished article is consequently shorter, while a slow movement of said gear produces a finished article of greater length. The shaft 78 is carried by the apron 70 and the hanger 79, depending from the rear of the bed 1. The inside hub of the gear 72 is provided with the dog 80. The gear 72 rotates from right to left, and at every revolution the dog 80 comes in contact with the finger 43, thereby reciprocating the bar 41 and separating the wheels 27, as before described. One method of varying the maximum distance between the wheels 27 has been explained. Another consists in moving the finger 43 on the bar 41, whereby the contact between the dog 80 and said finger is for a longer or shorter time, according as the finger is moved to the right or left, and thus increasing or decreasing the travel of said bar.

The movement of the carriage 17, which operates, with its coacting mechanism, the knives 13, depends upon a pattern on the rear end of the shaft 78 and certain intermediate parts yet to be described. Patterns of various shapes are used to produce the different articles desired, the one shown in the drawings being for rake-handles. The double segment 81, having the slots 81ª 81ª therein, is fast on the rear end of the shaft 78, and the pattern 82 is attached to said segment by bolts passing through said slots. The slots 81ª permit the pattern 82 to be adjusted in relation to the double segment 81 for the purpose hereinafter described. The bearings 83 83 on the right-hand end of the bed 1 carry the shaft 84, and the long arm 85 is fast to the rear end of said shaft. The short arm 86 is pivoted at one end to the arm 85 near the shaft 84 and has the roll 87, which rests upon the periphery of the pattern 82. The lug 88 rises from the top of the arm 86 and extends over the arm 85. The crank 89, threaded at its lower terminal, passes through threaded openings in the horizontal part of the lug 88 and in the arm 85, and by turning said crank said arm may be raised or lowered in relation to the arm 86. Centrally located on the shaft 84 is the arm 90, rigidly connected thereto and extending upward. The arm 90 has the slot 90ª therein, through which one end of the rod 91 is adjustably fastened to said arm. The rod 91 extends through an opening in the end of the bed 1, provided for its passage, and connects with the base of the carriage-box 16. The counterweight 92 depends from the rope 93, attached to the free end of the lever 85, and serves to always retain the roll 87 in contact with the pattern 82. It will now be seen that as the pattern 82 revolves beneath the roll 87 the lever 85 rises and falls with the irregularities in the periphery of said pattern and rocks the shaft 84, which in turn reciprocates the carriage 17 through the medium of the rod 91, thus automatically opening and closing the knives 13. The slot 90ª in the arm 90 enables the contiguous end of the rod 91 to be raised or lowered for the purpose of varying the taper of the stick which is being turned. When the rod 91 is secured to the upper part of the arm 90, the movement of the carriage 17 is increased, and a longer taper is consequently cut by the knives 13 through the operation of the intervening mechanism; but when the rod 91 is secured to the arm 90 lower down the movement of the carriage 17 is decreased, and consequently the taper is shortened.

Supposing a pile of rough sticks to be placed upon the bar 20 and the handle 57 to have been thrown so as to set all parts revolving, the complete operation of my machine is as follows: The gear-dog 80 engages the finger 43 and actuates the mechanism which opens the wheels 27. The end of the bottom stick at once drops between the revolving wheels 27, and they close upon it as soon as the dog 80 clears the finger 43. The stick is now carried between the centering-guides previously described and brought into contact with the knives 9, which round off said stick. While the end of the stick is traveling from the wheels 27 to where the knives 13 begin to cut, the pattern 82 turns beneath the roll 87 from the position shown in Fig. 2 to the point $d$. The greatest diameter of the pattern 82 has passed beneath the roll 87 and, through the intervening mechanism, has held the cutting edges of the knives 13 farther apart than are the cutting edges of the knives 9; but as soon as the point $d$ is passed the arm 85 drops and causes said knives 13 to close upon the stick. When the point $e$ on the pattern 82 arrives beneath the roll 87, the carriage 17 is driven to the left as far as it goes at any one revolution of said pattern, and the knives 13 make their deepest cut. From the point $e$ the diameter of the pattern 82 gradually increases, and the carriage 17 is slowly driven to the right, at the same time opening the knives 13 to increase the diameter of the stick. The hollow shaft 5 acts as a guide for the stick as it leaves the knives 13 and is forced between the revolving wheels 58, which convey the now finished article away from the machine. The foregoing description covers the turning of one piece only, but the operation is repeated very rapidly in practice, and a large number of pieces can be turned per minute.

If a longer cylindrical head is desired on the stick than is now provided for, simply loosen the bolts that hold the pattern 82 to the double segment 81, rotate said pattern, so as to bring the initial starting-point beneath the roll 87 farther away from the point $d$, and again tighten said bolts. This change allows the end of the stick to enter the machine farther before the knives 13 close upon said stick. A shorter head is formed by changing the pattern 82 to bring the initial starting-point nearer the point $d$.

The depth of the cut in the stick made by the knives 13 may be increased or diminished by turning the crank 89, so as to lower or raise the lever 85 accordingly. When the lever 85 is lowered, the carriage 17 is always farther to the left, and the cutting edges of the knives 13 are closer together, thereby cutting deeper, and when the lever 85 is raised the carriage 17 is always farther to the right, and the cutting edges of the knives 13 are never so close together, thereby not cutting so deep.

What I claim as my invention, and desire to secure by Letters Patent, is—

1. The combination in a turning-lathe, of revoluble vertical shafts having serrated wheels fast to their heads, a weighted lever connected to said shafts by links and pivoted between said links to a bed, a triangle pivotally attached to the free terminal of said lever, slidably supported between suitable guides, and adapted to be forced back by pressure against its short edge, and means for exerting a sufficient pressure thereon to oscillate said shafts through the intervening mechanism, substantially as and for the purpose set forth.

2. The combination in a turning-lathe, of revoluble vertical shafts having serrated wheels fast to their heads, a weighted lever pivoted to a bed and adapted to oscillate said shafts, a triangle pivoted to the free terminal of said lever, adapted to operate between suitable guides and actuate said lever, a bar attached to said bed with one end bearing on the short edge of said triangle, and means for reciprocating said bar against said triangle to actuate the same, substantially as and for the purpose set forth.

3. The combination in a turning-lathe, of revoluble vertical shafts having serrated wheels fast to their heads, a weighted lever pivoted to a bed and adapted to oscillate said shafts, a triangle pivoted to the free terminal of said lever, adapted to operate between suitable guides and actuate said lever, a reciprocating bar attached to said bed with one end bearing on the short edge of said triangle, a finger depending from the opposite end of said bar, and a revoluble gear having a dog adapted to engage said finger and actuate said bar, substantially as and for the purpose set forth.

4. The combination in a turning-lathe, of revoluble hollow shaft, a knife-holder fixed to one end of said shaft and carrying cutter-knives, spirally-grooved spindles engaging said knives, and a reciprocating disk adapted to partially rotate said spindles, revoluble vertical shafts having serrated wheels fast to their heads, a weighted lever pivoted to a bed and adapted to oscillate said shafts, a triangle pivoted to the free terminal of said lever adapted to operate between suitable guides and actuate said lever, a reciprocating bar attached to said bed with one end bearing on the short edge of said triangle, a finger depending from the opposite end of said bar, and a revoluble gear having a dog adapted to engage said finger and actuate said bar, substantially as and for the purpose set forth.

In testimony whereof I affix my signature in presence of two witnesses.

GEORGE H. OBER.

Witnesses:
H. P. BAILEY,
F. A. CUTTER.